(12) United States Patent
Beringer et al.

(10) Patent No.: US 8,595,227 B2
(45) Date of Patent: Nov. 26, 2013

(54) SEMANTIC ACTIVITY AWARENESS

(75) Inventors: Joerg Beringer, Los Altos, CA (US);
Markus Latzina, Wiesenbach (DE);
Cirrus Shakeri, Belmont, CA (US);
Thomas Herrmann, Dortmund (DE)

(73) Assignee: SAP AG, Walldorf (DE)

( * ) Notice: Subject to any disclaimer, the term of this patent is extended or adjusted under 35 U.S.C. 154(b) by 145 days.

(21) Appl. No.: 13/171,203

(22) Filed: Jun. 28, 2011

(65) Prior Publication Data

US 2013/0006967 A1    Jan. 3, 2013

(51) Int. Cl.
*G06F 7/00*    (2006.01)

(52) U.S. Cl.
USPC ........................................................ 707/732

(58) Field of Classification Search
None
See application file for complete search history.

(56) References Cited

U.S. PATENT DOCUMENTS

| | | | | |
|---|---|---|---|---|
| 2007/0245261 A1* | 10/2007 | Bukovec et al. | | 715/810 |
| 2008/0046868 A1* | 2/2008 | Tsantilis | | 717/136 |
| 2008/0250316 A1* | 10/2008 | Zhang et al. | | 715/708 |
| 2008/0320405 A1* | 12/2008 | Van Wyk et al. | | 715/764 |
| 2009/0043592 A1* | 2/2009 | Heimann et al. | | 705/1 |
| 2009/0089741 A1* | 4/2009 | Bornhoevd et al. | | 717/106 |
| 2010/0049740 A1* | 2/2010 | Iwase et al. | | 707/104.1 |
| 2010/0074524 A1* | 3/2010 | Stollman | | 382/175 |
| 2010/0100542 A1* | 4/2010 | Hawthorne et al. | | 707/732 |
| 2010/0107075 A1* | 4/2010 | Hawthorne et al. | | 715/708 |
| 2010/0131916 A1* | 5/2010 | Prigge | | 717/104 |
| 2011/0136542 A1* | 6/2011 | Sathish | | 455/566 |
| 2011/0295852 A1* | 12/2011 | Wang et al. | | 707/728 |
| 2012/0016678 A1* | 1/2012 | Gruber et al. | | 704/275 |
| 2012/0265779 A1* | 10/2012 | Hsu et al. | | 707/767 |

OTHER PUBLICATIONS

Granlund et al. "A Pattern-Supported Approach to the User Interface Design Process," Position paper for the UPA'99 Usability Professionals' Association Conf. (Scottsdale, AZ, Jun. 29-Jul. 2, 1999).*

* cited by examiner

*Primary Examiner* — Fred I Ehichioya
*Assistant Examiner* — Richard Bowen
(74) *Attorney, Agent, or Firm* — Fountainhead Law Group PC

(57) ABSTRACT

A domain-specific task may be defined from a library of domain-independent task patterns. A task pattern may be selected based on inferences made from a user's initial input, or just based on receiving sensor information through events or contextual information, or a combination of user input and sensor information. One or more elements of a selected task pattern may be defined in the context of a given domain to define the domain-specific task.

17 Claims, 6 Drawing Sheets

US 8,595,227 B2

SEMANTIC ACTIVITY AWARENESS

BACKGROUND

Unless otherwise indicated herein, the approaches described in this section are not prior art to the claims in this application and are not admitted to be prior art by inclusion in this section.

The notion of context-aware recommendation mechanisms typically is limited to recommending content based on current location, content, or a user profile. For example, when a user looks at a customer account in a CRM (customer relations management) system, a content recommendation component may pull up information related to the customer's account based on structured or fuzzy relationships. If actions related to a customer account object are modeled, the system may additionally list system functions that correspond to user actions that can be launched in combination with that account. In all such cases, the system does not develop a machine-executable understanding of a larger task context, but rather opportunistically recommends related content based only on the current content. In other words, the system knows only what content is currently selected, but not why.

Conventional approaches are not sufficient to provide procedural guidance in which tools and practices may be recommended based on an understanding of the task context and actions as part of a larger task context. Common approaches typically are centered around modeling concepts being representative of the particular field or domain while not considering the semantics of such concepts within a particular business situation or task As such, they fail to acknowledge that associations between structural entities, e.g., actors and artifacts, need to be characterized by additional relations that apply only for specific situations.

The adoption of semantic modeling technologies is somewhat limited due to the high investment in feeding semantic models with knowledge until an inference engine can make recommendations useful for completing the task. The task may be impractical in an existing enterprise where a great deal history and context has accumulated. Such modeling also requires special skills, typically the effort of knowledge engineers who are proficient in semantic representation methods such as OWL or Prolog. Domain-experts who have a sound understanding of concepts and rules for a particular domain are typically not able to create such models due to the level of abstraction and special syntax.

A successful design time for implementing task models and instrumenting software to inform task awareness engines must therefore consider the different expert profiles and locality of modeling different abstraction levels. These and other issues are addressed by embodiments of the present invention, individually and collectively.

SUMMARY

In embodiments, a method includes storing a plurality of task patterns and defining a domain-specific task based on one of the task patterns. In an embodiment, the task patterns are domain-independent. Initial input may be received which represents domain-specific information. An inference may be made from the initial input to identify one or more candidate task patterns. A selected task pattern may then serve as the basis for defining the domain-specific task. Action items that comprise the selected task pattern may be presented and in response, information about domain-specific action items may be received, from which the domain-specific task may be defined. In embodiments, an inference may be made on the initial input to identify the list of candidate task patterns.

In embodiments, the domain-specific tasks or elements thereof may be represented in a diagrammatic modeling language and may also be represented in a knowledge representation language.

In embodiments, the number of action items in the domain-specific task may be less than the number of action items in the task pattern.

In embodiments, a new task pattern may be defined and added to the existing task patterns.

In embodiments, the interaction information generated during interaction with a user may be used to select or be interpreted as indicative of a first domain-specific task from among a plurality of domain-specific tasks. One or more instances of action items that comprise the first domain-specific task may be stored with meta data for subsequent processing or presented to the user.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
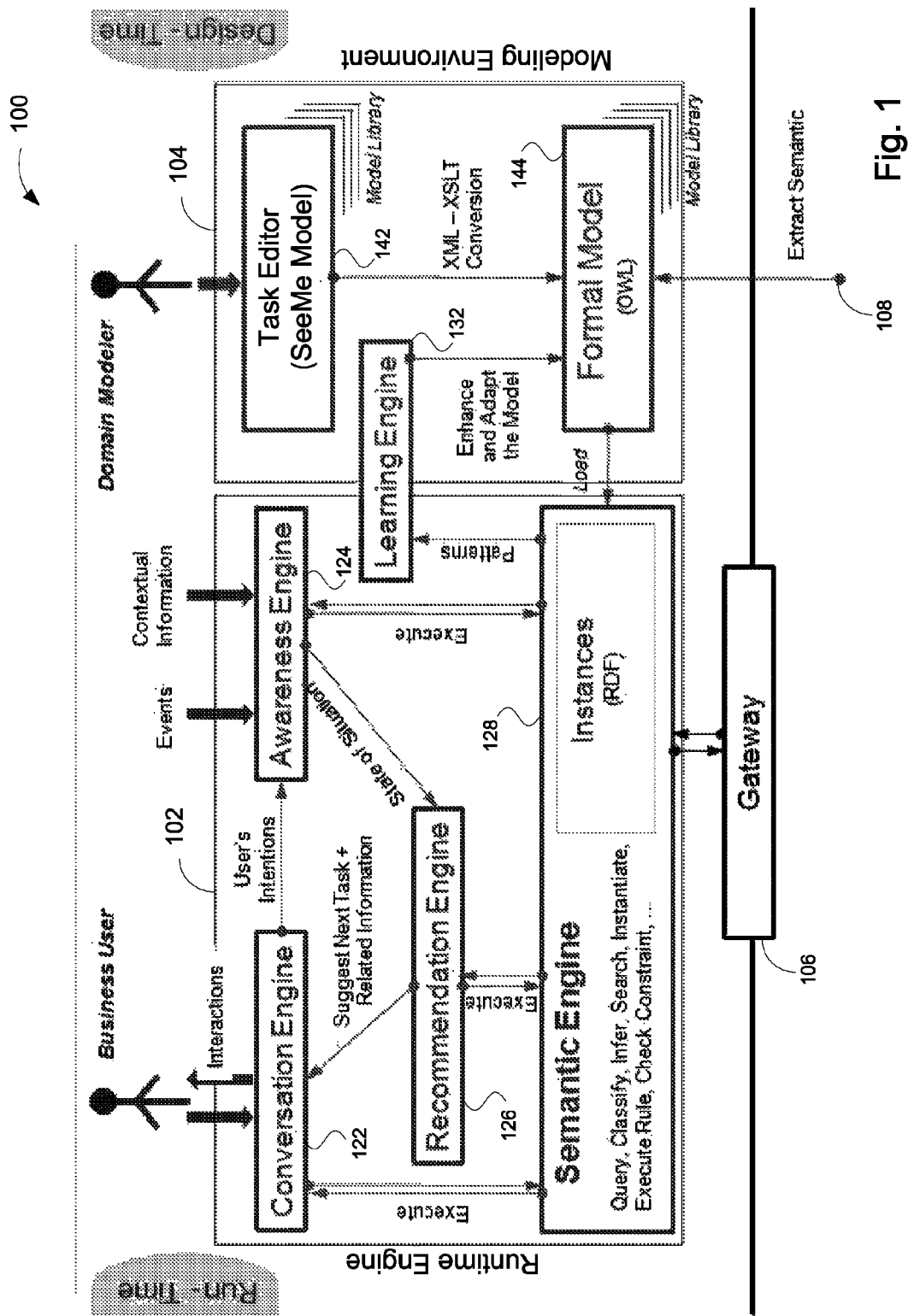
FIG. 1 is a high level block diagram of an interactive system incorporating an embodiment of the present invention.

Referring to FIG. 1, a system 100 to facilitate task execution may incorporate an embodiment of the present invention. The system 100 may be deployed in an enterprise to provide task planning/execution/recommendation services to users (consumers) working in the enterprise. A consumer (e.g., a business user, etc.) may interact with a component of the interactive system 100 called a runtime engine 102. A provider (e.g., knowledge engineer, domain expert, domain modeler, and the like) may interact with a model library 104 of the interactive system. A gateway 106 may connect the interactive system 100 with resources stored in enterprise systems or other systems; e.g., the Internet, an intranet, and so on. Formal semantic representations maybe generated and stored in the model library 104 from existing data via an access port 108.

The runtime engine 102 may include a conversation engine 122 with which the consumer may interact. An awareness engine 124 may receive information from the conversation engine 122 representative of the consumer's intentions, based on the current dialog between the consumer and the conversation engine. The awareness engine 124 may receive information indicative of events and other contextual information relating to activity in the enterprise. A recommendation engine 126 may provide recommendations of action items to the conversation engine 122 for presentation to the consumer. An underlying semantic engine 128 may be accessed by the foregoing components. The semantic engine 128 may provide information that gives meaning to the consumer's interactions in the context of what is going on in the enterprise.

The conversation engine 122 may employ natural language processing or other conversation techniques, along with suitable interface extensions to provide a suitable environment for interaction with the consumer. The conversation engine 124 may interact with the consumer via its interface extensions, e.g., via a display device, providing a suitable graphical user interface, or a command line interface, or via a speech-to-text interface. The conversation engine 124 may include a voice interface having suitable voice recognition capability, and so on.

The awareness engine 124 may connect with other systems in the enterprise to monitor and/or collect information relating to the on-goings in the enterprise. For example, the awareness engine 124 may connect to email servers or calendaring systems within the enterprise to collect and/or monitor data for business transactions, events, and other activities. The awareness engine 124 may connect to other systems in the enterprise (e.g., PLM—product lifecycle management, CRM—customer relationship management, PPS—product production system, and so on), to collect and/or monitor information and activities to provide contextual information for the awareness engine. Such "sensor information" may be used by the recommendation engine 126 to identify relevant tasks to be performed.

The conversation engine 122 may analyze the interaction information generated from its interactions with the consumer and generate information regarding the consumer's intentions, which may then be provided to the awareness engine 124. The awareness engine 124 may generate context information that indicates a situational state of the consumer. Such information may be reported to the recommendation engine 126, which may then access the semantic engine 128 to identify relevant tasks that may need to be performed, or that may be recommended for consideration. The recommendation engine 126 may then present those tasks as recommendations to the consumer, along with any related or relevant information particularly the reasons for making such recommendations.

The semantic engine 128 may store knowledge gathered from the enterprise (e.g., via the gateway 106) and store that knowledge in a suitable form; e.g., using RDF—resource description framework. The semantic engine 128 may operate on a semantic representation stored in the model library 104. Patterns of activity detected by the semantic engine 128 may be sent to a learning engine 132. The learning engine 132 may update the model library 104 to enhance semantic models of tasks (i.e., formal model) during run-time that are developed, defined, modeled, stored, and maintained by the design-time component.

In embodiments, the model library 104 provides an environment for developers to develop, design, define, and maintain models of tasks. The model library 104 may include a task model editor 142 and suitable associated data storage for storing representations generated by the task model editor. The model library 104 may include a data store that contains formal models 144 which have their origination in the task model editor 142. The learning engine 132 may provide updates to the formal models 144.

The model library 104 may be accessed by various providers of task knowledge. For example, providers may be knowledge engineers who acquire knowledge and store it as knowledge representations in computer systems in order to provide the basis for solving problems which are normally knowledge-intensive or require a high level of expertise. In embodiments, knowledge engineers may provide high-level context-free domain-independent representations of tasks called "task patterns" using a task model editor 142. Providers may include domain experts who have specific knowledge in a given domain of activity. Domain experts may model tasks in the context of a specific domain using the task model editor 142, such tasks are referred to herein as "domain-specific tasks".

As used herein, the term "task" will refer to an activity. Tasks, in terms of set containment or nested-ness, may comprise a structure of "sub tasks". Sub tasks may be viewed as smaller tasks that relate to performing the task; for example, a task of making a pizza may include a sub task of making the pizza dough, another sub task of preparing the sauce, and so on. Sub task themselves may contain their own sub task. For example, the sub task of preparing the sauce may include a sub task of purchasing the ingredients. Task and sub tasks may be defined by one or more "action items" which represent individual actions that may be performed to accomplish the activity. An action item may be represented by a 3-tuple of task elements comprising an "actor" performing an "action" on an "artifact" (or "resource"). An action item may be associated with a "tool", which may be a device or information used to perform or otherwise facilitate performance of the action; for example, a document editor might be viewed as being a tool for creating a document. In a more formal sense, an ideal and complete task (or an ideal sub task) is composed of the task elements "actor", "action", and "artifact".

Figure 2:
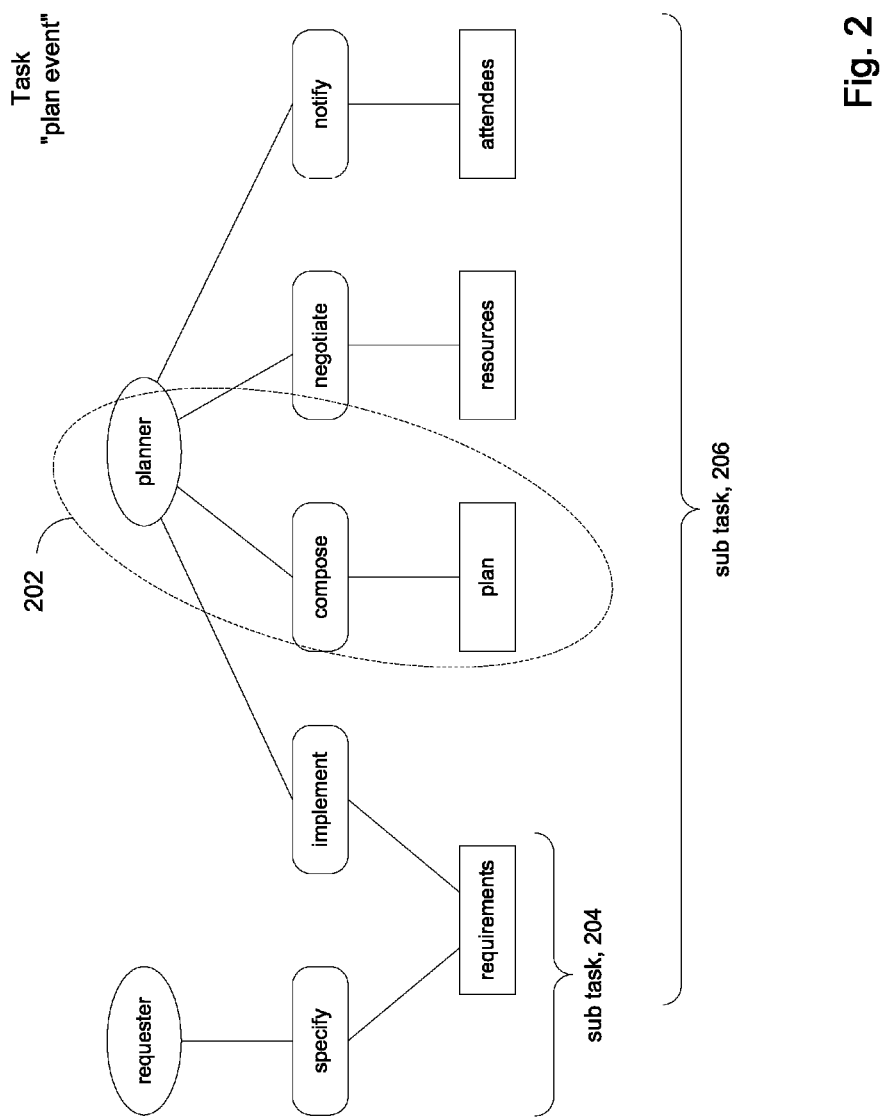
FIG. 2 represents an example of a domain-independent task (task pattern).

Referring to FIG. 2, a graph may be used to represent a task. The action items may be represented in the graph where actors and artifacts constitute nodes in the graph, and the actions are represented by edges in the graph. The example shown in FIG. 2 represents a task called "plan event". An example of an action item 202 may be the "planner" (actor) to "compose" (action) a "plan" (article). An example of a sub task may be 204 which is comprised of one action item, namely requester-specify-requirements. Another example of a sub task may be the grouping 206 of action items where "planner" is a common actor. It will be appreciated that other sub tasks may be defined; for example, an "initial planning" sub task may be defined that is comprised of the "planner" actor and the "implement" and "compose" actions, while a "post planning" sub task may be defined that is comprised of the "planner" actor and the "negotiate" and "notify" actions, and so on. The definition of the task, any constituent sub tasks, and the constituent action items may be determined by the providers of the task knowledge.

As used herein, the term "domain" will be understood to refer to a particular context, or application, or subject matter, or field of use for a task and its constituent action items. Accordingly, a domain-independent task is a task that has no specific context, is not applied to any specific application, is not tied to any specific subject matter, has no specific field of use, and so on. It will be understood that the term "task pattern" will refer to domain-independent tasks. For example, the task pattern called "plan event" may be referred to as being domain-independent because it has no context; the term "event" conveys no information about the nature of the event and may be anything; there is no description of the event. The "event" could be a gathering of world leaders at the United Nations, or it could be having lunch with some co-workers. Accordingly, nothing specific can be said about how to accomplish the task of "plan event". Likewise, it may be appreciated that a action item such as the triplet "requester-specify-requirements" is not associated with a domain because the action item identifies an actor ("requester") and an article ("requirements"), but does not have any description as to who or what the actor is; there is no description as to what the nature of the requirements are. Such tasks and action items are said to be "domain-independent" or "context-free" because they express actions on generic objects. There is no description of what the object is.

Conversely, if the "event" is a wedding, then there is a context for what "plan event" means; there is a description that informs what the event is. Action items may be associated with descriptive information about the actor and the artifact, giving them meaning in a specific domain. For example, the "requester" may be the bride-to-be, the "requirements" may include wedding date, guest list, etc., the "notify" action may include sending out invitations, and so on. The wedding task is said to be a "domain-specific" instance of the more general task of "plan event" because the task is referenced in the context of a specific domain, namely a wedding. As another example, if the "event" is a business trip, then the task may be associated with the domain of travel. The "requester" may be the traveler, and the "requirements" may include travel date, destination, etc., the "negotiate" action may be getting the best air fare, obtaining a seat in business class, and so on. Again, the business trip task is said to be a domain-specific instance of the generic "plan event" task.

Figure 2A:
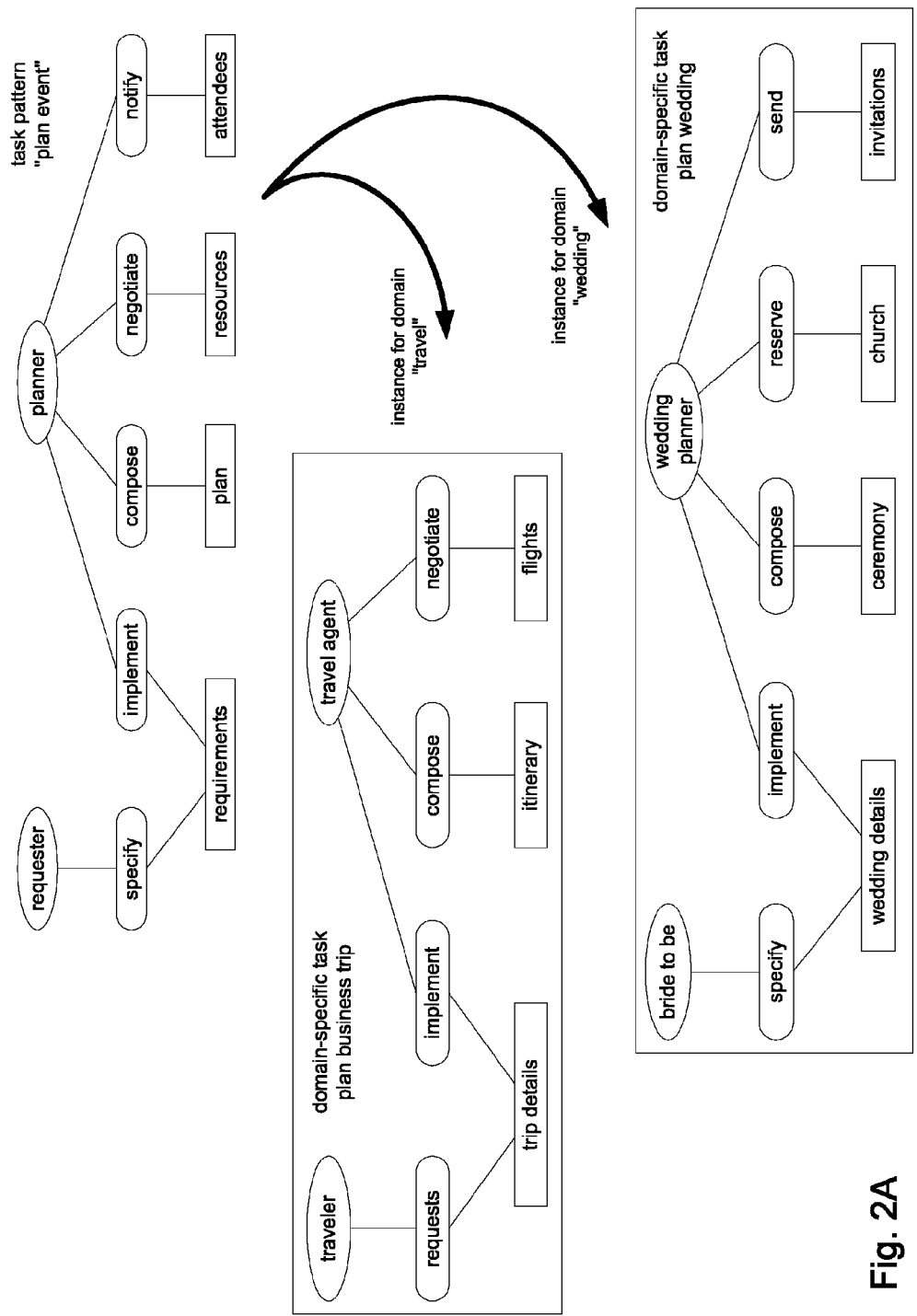
FIG. 2A represents an example of instantiations of domain-specific tasks.

It may be appreciated that a task that is domain-independent may include considerably more action items and sub tasks than a domain-specific instance of that task. If a task is domain-independent, then a provider (e.g., knowledge engineer) may include as many sub tasks and action items as possible when defining a domain-independent task in order to cover as many aspects of accomplishing the task as possible. The task shown in FIG. 2 represents an example of a domain-independent task. The domain-specific task for wedding planning may include all the action items shown in FIG. 2. On the other hand, the domain-specific task for business trip planning may not require the "notify" action. This comparison is shown in FIG. 2A. The domain-independent task, therefore, specifies a general pattern (a frame) of action items from which domain-specific tasks may be defined. Accordingly, the domain-independent task may be called a task pattern or a task frame. In embodiments, a task pattern may be defined to include action items which may not be applicable or relevant to a given domain-specific task. A task pattern should be defined by the provider to be over-inclusive of action items so as to allow for any domain-specific task to be subsequently derived and defined from that task pattern.

Figure 3:
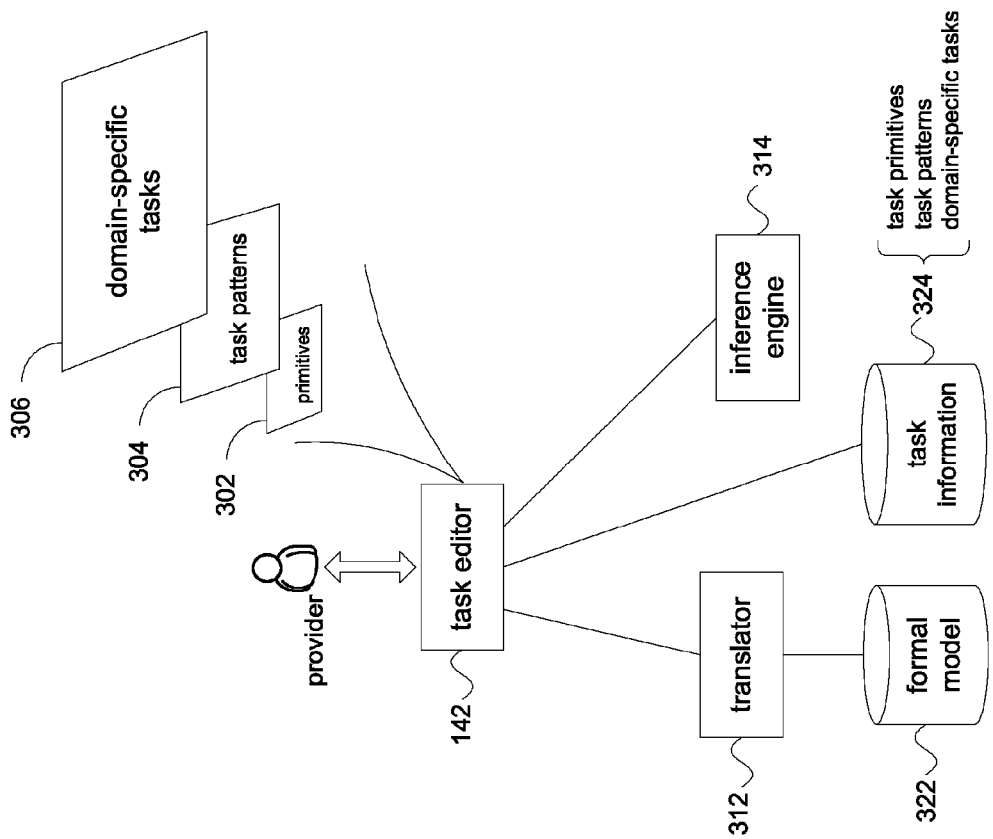
FIG. 3 is a block diagram representing details of the design-time component shown in FIG. 1.

Refer now to FIG. 3 for additional details of the model library 104. In embodiments, the task model editor 142 may present a view of tasks and task modeling in terms of three levels of abstraction. At an abstract level, a core task semantic layer (core layer) 302 may be modeled. The core layer 302 represents core knowledge about process semantics that may be considered the core foundation for all models. The core layer 302 may define basic building blocks (task primitives) for modeling a task. The core layer may 302 define, in terms of general structural properties and relationships, the basic concepts such as actors, artifacts, resources, tools, actions, etc. This core layer 302 reflects what is typically represented in process ontologies by concepts which are specific to a particular process context.

Building on the core layer 302, a library of task patterns (library layer 304) may be comprised of task patterns defined using the task primitives of the core layer 302. Building largely on the library layer 304, but also on the core layer 302, a collection of domain-specific tasks may be defined in a domain layer 306. The domain layer 306 may be comprised of instantiations of task patterns in a particular domain. For example: "Trip Planning" may be a domain-specific instantiation of "plan event" and may model more specifically an itinerary in terms of a plan, accommodation, transport, etc. as plan segments, hotels, taxi, flight as resources. "Wedding Planning" may be another domain that can also be derived from the general "plan event" task pattern.

The task model editor 142 may receive input from the provider (e.g., knowledge engineers and domain experts) to design, define, model, and maintain task patterns and domain-specific tasks that are stored in the system. The task model editor 142 may provide a suitable interface, whether graphically based or command line based, and so on, for providers. In an embodiment, the task model editor 142 may employ a graphical user interface (GUI) that interacts with the user according to well-understood graphical interaction principles (e.g., certain shapes imply a particular class of objects, spatial arrangements of objects imply particular relations among the objects, etc).

In a particular embodiment, the task model editor 142 may be based on a diagrammatic modeling language called SeeMe. Both task patterns and domain-specific tasks (collectively "tasks") may be rendered in a GUI using the notation of the SeeMe modeling language. Using the task model editor 142, a provider may edit a SeeMe representation of a task. The provider may modify predefined tasks, or create a new task from scratch. A description of the SeeMe notation is given in a document titled "SeeMe in a nutshell—the semi-structure, socio-technical Modeling Method" by Thomas Hermann (published November 2006), which is incorporated herein by reference for all purposes.

In embodiments, a task data store 324 may be provided to store representations of tasks, including task patterns and domain-specific tasks, as informal models represented in a suitable modeling language (e.g., SeeMe models). Tasks stored in the task data store 324 may be accessed by the task model editor 142 for review, modification, and so on by a provider. Accordingly, the task model editor 142 may retrieve previously-defined task models, browse a library of models, make searches, and so on. New models may be created from pre-existing models, or from scratch, and so on. The task data store 324 may also store elements of the core layer 302, such as the task primitives.

In embodiments, a task translator 312 may be invoked by the task model editor 142 to translate the informal model representation of a task into a suitable formal knowledge representation for semantics processing. For example, OWL (Web ontology language) and Prolog are formal ontologies that may be used to represent the knowledge contained in a task. Parts of the informal model may have a direct translation; e.g., using the label of a node as the name of a concept and representing the concept accordingly in the formal model. Other parts of the informal model that may only have internal implicit representations and may need to be exposed to the task translator 312 in order to make an adequate translation. The provider may participate in the translation process in order to overwrite system default translations, or to disambiguate translation options or otherwise resolve conflicts. The provider may introduce ontological constructs in addition to the constructs that might be generated from the model, and so on. A formal models data store 322 may be provided to store internal representations of the formal models generated by the task translator 312.

Figure 4:
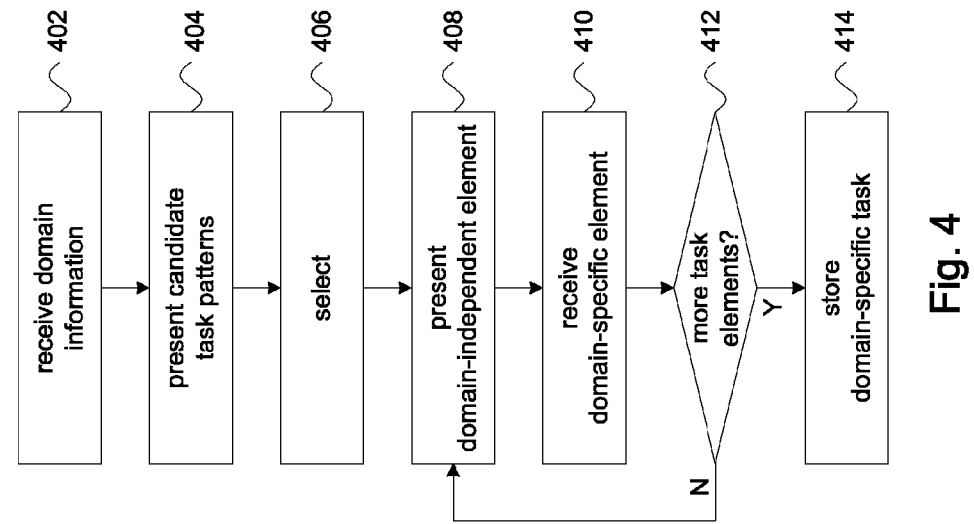
FIG. 4 is a process flow for defining a domain-specific task.

In embodiments, a provider may interact with the task model editor 142 to define a domain-specific task. FIG. 4 represents at typical process flow for defining a domain-specific task in accordance with embodiments. Thus, in a step 402, the provider (e.g., a domain expert) may input to the task model editor 142 domain-specific information in connection with performing a task. For example, in an embodiment where the task model editor 142 is a GUI, a task may be modeled using a graph comprising boxes arranged in a hierarchy, and connected by lines. The provider may select a box graphic and type the phrase wedding dress in the box. The phrase wedding dress may be considered an example of domain-specific information; the term dress specifies a specific piece of clothing (which would be a more generic term), and the term wedding further specifies a class of dresses.

In embodiments, the task model editor 142 may use the domain-specific information received in step 402, to identify one or more domain-independent task patterns (step 404). For example, suppose the provider inputs the phrase wedding dress. The task model editor 142 may parse the input to identify wedding dress and wedding and dress as possible semantic elements. The task model editor 142 may communicate with an inference engine 314 to make inferences as to what the provider is attempting to define. Information used to drive the inference engine 314 may include the parsed semantic elements, the formal models in data store 322, and/or task patterns in data store 324. Historical learned information from previous domain-specific task definitions may be used to inform the inference engine 314.

The task model editor 142 may access the task data store 324 to obtain any task patterns that match or relate to the input or any inferences that were made from the input. Such task patterns would constitute a list of candidates for defining and further specifying the domain-specific task. Consider the wedding dress example, for instance, an inference may be made that the provider is wanting to define a task for designing wedding dresses. A task pattern called "make clothing" may be considered a candidate. Another inference may be made that the task is for planning a wedding. Accordingly, a task pattern called "plan event" may also be added to the list of candidates. Yet another inference may be that the task is for marketing wedding dresses, in which case a task called "sell things" may be added to the list. Having identified the list of candidate task patterns, the task model editor 142 may present the list to the provider. In a step 406, the provider may make a selection from the list and inform the task model editor 142 accordingly.

In a given usage scenario, the provider may simply call up a list of the predefined task patterns and browse the list to identify a suitable task pattern from which to construct their domain-specific task, thus obviating steps 402 and 404. Where the task is clear it may be easy to browse the collection of task patterns; e.g., planning a wedding could easily be identified with the task pattern "plan event". However, if the collection of task patterns is very large, as may very well be the case in a large business enterprise, then searching through a large number of task patterns may not be practical. Also, if the task at hand is not very well defined it may not be practical to browse the collection of task patterns. In such a scenario, it may be more prudent for the provider to let the system make an inference as to the task and recommend one or more candidate task patterns, thus greatly narrowing the search space for the provider.

In a step 408, the task model editor 142 has been informed of a selected task pattern from the among the candidates presented in step 404. The task model editor 142 may "walk" the graph that represents the selected task pattern to identify the domain-independent action items to instantiate the selected task pattern. In an embodiment, the task model editor 142 may present to the provider each constituent domain-independent action item of the selected task pattern in step-wise fashion, picking an action item, instantiating it with domain-specific information, moving to the next action item, and so on. For example, referring to FIG. 2, the following action items which are part of the task pattern "plan event" may be presented to the user:

requester-specify-requirements
    planner-implement-requirements
    planner-compose-plan
    planner-negotiate-resources
    planner-notify-attendees Consider the action item "requester-specify-requirements". The task model editor 142 may present the three constituent task elements ("requester", "specify", and "requirements") to the user, and prompt the user to input information (domain-specific information) for each element, thus instantiating the action item. In an embodiment, the task model editor 142 and/or inference engine 314 may make an inference with each action item to decide whether or not to present the next action item to the provider, conditionally narrowing down the available "remaining" action items depending on the provider's previously entered information. The task model editor 142 may recommend how an action item may be instantiated in the context of the domain information previously received from the provider, and so on. In an embodiment, the task model editor 142 may present to the provider an entire sub task within the selected task pattern to instantiate the sub task "at once" with domain-specific elements.

In a step 410, the provider may deem that the presented action item is not relevant to the domain specific task they are wanting to define, and thus may reject the presented action item and move onto the next action item (step 412). The provider may decide that the presented action item is relevant, and input domain-specific information to instantiate the action item and add it to the domain-specific task being constructed. The next action item from the task pattern, if any, may then be selected and steps 408 and 410 repeated accordingly.

It may be appreciated that with each iteration of steps 408 and 410, additional domain-specific information feeds into the task being constructed. Accordingly, the inference engine 314 may be able to incrementally refine its ability to decide whether to present a action item from the task pattern and/or to make recommendations about how a particular action item from the task pattern may be instantiated in the context of the domain-specific information that has been input by the provider.

In a step 414, a completed domain-specific task may then be stored in the data store 324. In addition, the completed domain-specific task may be sent to the translator 312 for translation to a suitable representation for semantic processing in the runtime engine 102.

By applying a layered semantic modeling approach which incorporates predefined and interrelated model components at various levels of abstraction and semantic inferences pertaining to semantic task awareness, the creation of domain-specific models may be optimized on the basis of and by applying pre-existing and thus reusable task patterns. Embodiments may allow the building of tutoring system as a supplement to a design time environment for modeling end user applications, including recommendation and explication components, by which a provider (e.g., domain expert) may directly apply insights generated in this course to the modeling task itself.

The task model editor 142 may be used by providers (e.g., knowledge experts) to define the task patterns. Since task patterns by definition are context-free and thus independent of any specific domain, the task model editor 142 may omit making any inferences about what the provider is attempting to do. The task model editor 142 may simply be a "dumb editor", acting merely as an interface to facilitate the provider in defining the task pattern. The task model editor 142 may provide search and browsing utilities to search through pre-existing task patterns and pre-existing domain-specific tasks.

Figure 5:
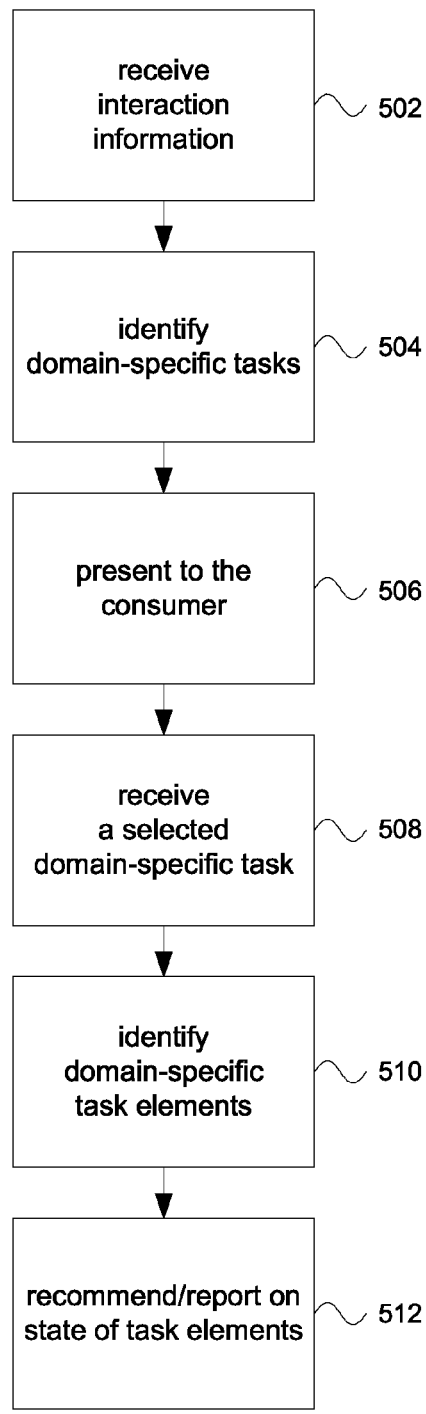
FIG. 5 is a process flow illustrating the selection of a domain-specific task and producing recommendations.

In embodiments, the formal models of the domain-specific tasks defined in the design time environment and stored in the formal models data store 322 may be loaded into the semantic engine 128 of the runtime engine 102 and then called upon during interactions with a consumer (e.g., business user). These formal models may inform the runtime engine 102 about tasks that may be relevant to the consumer as they interact with the system 100. FIG. 5 is a high level process flow of how recommendations may be made in embodiments.

In a step 502, interaction information may be received from the conversation engine 122 and the awareness engine 124 as explained above in connection with FIG. 1. Such information may be received by the recommendation engine 126. The recommendation engine 126 and the semantic engine 128 may cooperate to identify one or more domain-specific tasks (step 504) as being relevant to the consumer as determined based on events occurring in the enterprise and other contextual information sensed by the awareness engine 124. In a step 506, the conversation engine 122 may present the one or more identified domain-specific tasks to the consumer as possible things they may want to do. The consumer may then identify and select a relevant task (step 508).

It will be appreciated that the identification of domain-specific tasks may be made purely on the basis of sensor information without reference to any information relating to interaction between the consumer and the conversation engine 122. For example, the awareness engine 124 may receive sensor information as events or contextual information, which could trigger the identification of one or more domain-specific tasks.

In a step 510, the recommendation engine 126 may receive information about the selected task. The recommendation engine 126 may then traverse the formal model representation of the selected domain-specific task to identify its constituent action items. Using information from the conversation engine 122 about the consumer's current interactions and information from the awareness engine 124, the recommendation engine 126 may be able to assess the state of each action item and make recommendation or otherwise report on the state of a action item (step 512). For example, if the action item has been completed, the recommendation engine 126 may report that fact to the consumer. If the action item has not been completed, the recommendation engine 126 may be able to determine what remaining action items need to be performed, and report that information to the consumer. The recommendation engine 126 may make recommendations as to possible courses of action to take to complete the action item, and so on.

Figure 6:
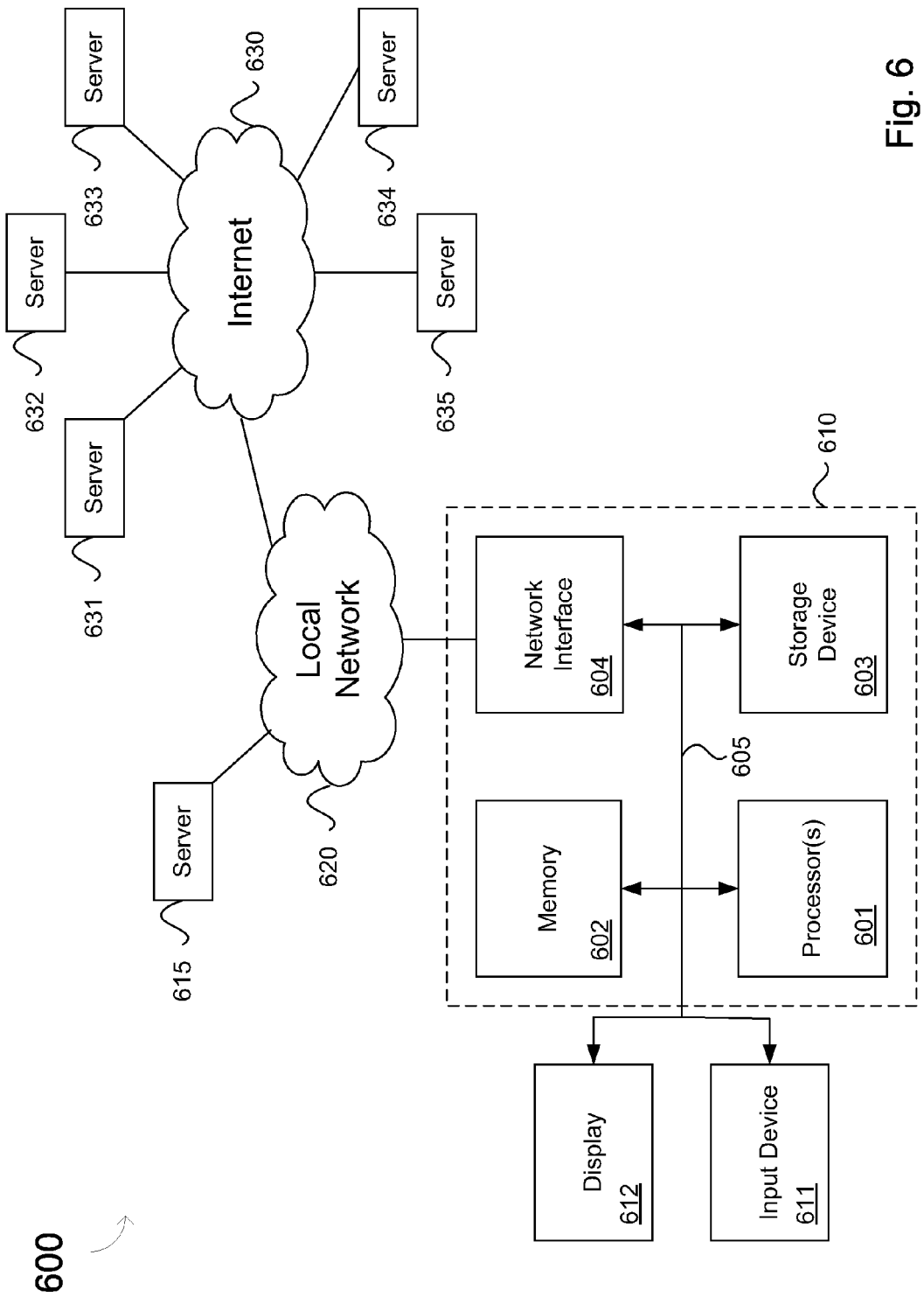
FIG. 6 is a high level block diagram of a computer system that may embody aspects of the present invention.

Referring now to FIG. 6, in embodiments, a computer system 600 can be configured to operate in accordance with aspects of the present invention. For example, computer system 600 may be configured as either the runtime engine 102, or the model library 104, or both. A data processor subsystem 601 may comprise one or more data processing units. A memory subsystem 602 may comprise random access memory (usually volatile memory such as DRAM) and non-volatile memory such as FLASH memory, ROM, and so on. A storage subsystem 603 may comprise one or more mass storage devices such as hard disk drives and the like. The storage subsystem 603 may include remote storage systems; e.g., for data mirroring, remote backup and such. A network interface subsystem 604 can provide users (e.g., consumers and providers) with access to the computer system 600, for example over a telecommunication network. A system of buses 605 can interconnect the foregoing subsystems, providing control lines, data lines, and/or voltage supply lines to/from the various subsystems. The computer system 600 may include a suitable display(s) 612 and input devices 611 such as a keyboard and a mouse input device.

The memory subsystem 602 may have stored in the non-volatile memory computer executable programs, which when executed can cause the data processing subsystem 601 to operate as a database system in accordance with aspects of the present invention. For example, the memory subsystem 602 may include computer executable programs that constitute the constituent engines in the runtime engine 102. The memory subsystem 602 may include computer executable programs that constitute the model library 104. The storage subsystem 603 may provide storage for the formal models data store 322 and/or the tasks data store 324.

Database encryption in accordance with the present invention can achieve comparable performance as a non-encrypted database, thereby significantly outperforming any existing encryption technique that we are aware of. At the same time, embodiments in accordance with the present invention can achieve a comparable level of privacy as an ideal encryption scheme. In all, aspects of the present invention exhibit good privacy and good performance even for scenarios in which attackers have precise knowledge of the domain and frequency distributions.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising operating a computer to perform steps of:

storing a plurality of task patterns, each task pattern comprising a plurality of action items, wherein the task pattern is domain-independent and has no specific context, is not applied to a specific application, and is not tied to any specific subject matter;

defining a domain-specific task from one of the task patterns, wherein the domain-specific task is associated with a context;

storing the domain-specific task for subsequent execution, wherein defining a domain-specific task comprises:

receiving initial input that represents domain-specific information;

identifying a plurality of candidate task patterns from among the task patterns based on the initial input;

receiving input that identifies a selected task pattern from among the candidate task patterns;

for each action item among a plurality of action items that comprise the selected task pattern, receiving domain-specific action information and instantiating said each action item as a domain-specific action item using the received domain-specific action information; and storing the domain-specific action items in a data store;

receiving interaction information generated by interacting with a user;

identifying a first domain-specific task from among a plurality of domain-specific tasks based on the interaction information;

identifying one or more action items that comprise the first domain-specific task based on the interaction information; and presenting the one or more action items to the user.

2. The method of claim 1 wherein the number of action items that comprise the domain-specific task is less than the number of action items that comprise the selected task pattern.

3. The method of claim 1 wherein the task patterns comprise an actor and an article that is acted on by the actor, wherein action items which comprise the task pattern do have descriptive information that describe the actor or the article.

4. The method of claim 1 wherein the step of identifying candidates of task patterns includes making an inference on the initial input to identify one or more of the task patterns.

5. The method of claim 1 further comprising receiving information to define a new task pattern and storing the new task pattern with the plurality of task patterns.

6. The method of claim 1 further comprising storing the domain-specific task as a data model.

7. The method of claim 6 wherein the data model is represented in a knowledge representation language.

8. A system comprising:
a data processing component;
computer program code; and
a first data store of task patterns, each task pattern comprising a plurality of action items, wherein the task pattern is domain-independent and has no specific context, is not applied to a specific application, and is not tied to any specific subject matter,
wherein the computer program code is configured to cause the data processing component to define a domain-specific task by performing steps of:
defining a domain-specific task from one of the task patterns, wherein the domain-specific task is associated with a context;
storing the domain-specific task for subsequent execution, wherein defining a domain-specific task comprises:
receiving initial input that represents domain-specific information;
identifying a plurality of candidate task patterns from among the task patterns based on the initial input;
receiving input that identifies a selected task pattern from among the candidate task patterns;
for each action item among a plurality of action items that comprise the selected task pattern, receiving domain-specific action information and instantiating said each action item as a domain-specific action item using the received domain-specific action information; and
storing the domain-specific action items in a data store;
receiving interaction information generated by interacting with a user;

identifying a first domain-specific task from among a plurality of domain-specific tasks based on the interaction information;

identifying one or more action items that comprise the first domain-specific task based on the interaction information; and presenting the one or more action items to the user.

9. The system of claim 8 wherein the number of action items that comprise the domain-specific task is less than the number of action items that comprise the selected task pattern.

10. The system of claim 8 wherein each task pattern represents an activity that is not specific to any domain.

11. The system of claim 8 wherein the step of identifying candidates of task patterns includes making an inference on the initial input to identify one or more of the task patterns.

12. The system of claim 8 wherein the computer program code is further configured to cause the data processing to perform a step of receiving information to define a new task pattern and storing the new task pattern with the plurality of task patterns.

13. The system of claim 8 wherein the computer program code is further configured to cause the data processing to perform a steps of:
rendering the domain-specific task using a diagrammatic modeling language; and
storing the domain-specific task in a knowledge representation language.

14. A tangible non-transitory computer readable storage medium having stored thereon computer executable code, the computer executable code configured to cause a processing system to:
receive initial input that represents domain-specific information;
identify a plurality of candidate task patterns from among a plurality of stored task patterns based on the initial input, wherein the task patterns are domain-independent and have no specific context, are not applied to a specific application, and are not tied to any specific subject matter;
receive input that identifies a selected task pattern from among the candidate task patterns;
for each action item among a plurality of action items that comprise the selected task pattern, receive domain-specific action information and instantiating said each action item as a domain-specific action item using the received domain-specific action information; and
store the domain-specific action items in a data store as a plurality of domain specific tasks, wherein the domain-specific tasks are associated with a context;
receive interaction information generated by interacting with a user;
identify a first domain-specific task from among a plurality of domain-specific tasks based on the interaction information;
identify one or more action items that comprise the first domain-specific task based on the interaction information; and
present the one or more action items to the user.

15. The non-transitory computer readable storage medium of claim 14 wherein the number of action items that comprise the domain-specific task is less than the number of action items that comprise the selected task pattern.

16. The non-transitory computer readable storage medium of claim 14 wherein each task pattern represents an activity that is not specific to any domain.

17. The non-transitory computer readable storage medium of claim 14 wherein the computer executable code is further configured to cause the processing system to:
  store the domain-specific task as data model represented in a diagrammatic modeling language; and
  convert the diagrammatic modeling language data model to produce a data model represented in a knowledge representation language.

\* \* \* \* \*